United States Patent [19]
Clebowicz

[11] Patent Number: 5,282,196
[45] Date of Patent: Jan. 25, 1994

[54] BURSTED AND NON-BURSTED DATA ROUTER

[75] Inventor: Brian A. Clebowicz, Redondo Beach, Calif.

[73] Assignee: Hughes Aircraft Company, Los Angeles, Calif.

[21] Appl. No.: 776,942

[22] Filed: Oct. 15, 1991

[51] Int. Cl.$^5$ .................................. H04Q 11/04
[52] U.S. Cl. ........................ 370/58.1; 370/94.1
[58] Field of Search .............. 370/58.1, 60, 94.1, 370/100.1, 91, 62, 84, 85.1, 105.1

[56] References Cited

U.S. PATENT DOCUMENTS

| | | | |
|---|---|---|---|
| 4,206,322 | 6/1980 | Lurtz | 370/63 |
| 4,207,435 | 6/1980 | Okada et al. | 370/68 |
| 4,320,500 | 3/1982 | Barberis et al. | 370/60 |
| 4,718,058 | 1/1988 | Van Vugt | 370/63 |
| 4,748,618 | 5/1988 | Brown et al. | 370/94.1 |
| 4,894,821 | 1/1990 | Hayano | 370/58.1 |
| 4,941,141 | 7/1990 | Hayano | 370/58.1 |

Primary Examiner—Douglas W. Olms
Assistant Examiner—Shick Hom
Attorney, Agent, or Firm—Phyllis Y. Price; William J. Streeter; Wanda Denson-Low

[57] ABSTRACT

A data router for receiving input data, having a timing characteristic, and transmitting output data that is either bursted or non-bursted. The non-bursted data comprises frames of data with each frame comprising slots of data, each slot having a position and a number. The invention (200) provides translation between bursted and non-bursted formats and includes an input buffer circuit (104) for receiving input data from an input channel and storing the input data as the input data is received from the input channel. An output buffer circuit (210) is included for formatting the stored input data, translating between bursted and non-bursted data formats and outputting the formatted and translated data to an output channel. A sequencer (105) routing controller circuit controls the operation of the input buffer circuit (104) and output buffer circuit (210).

26 Claims, 19 Drawing Sheets

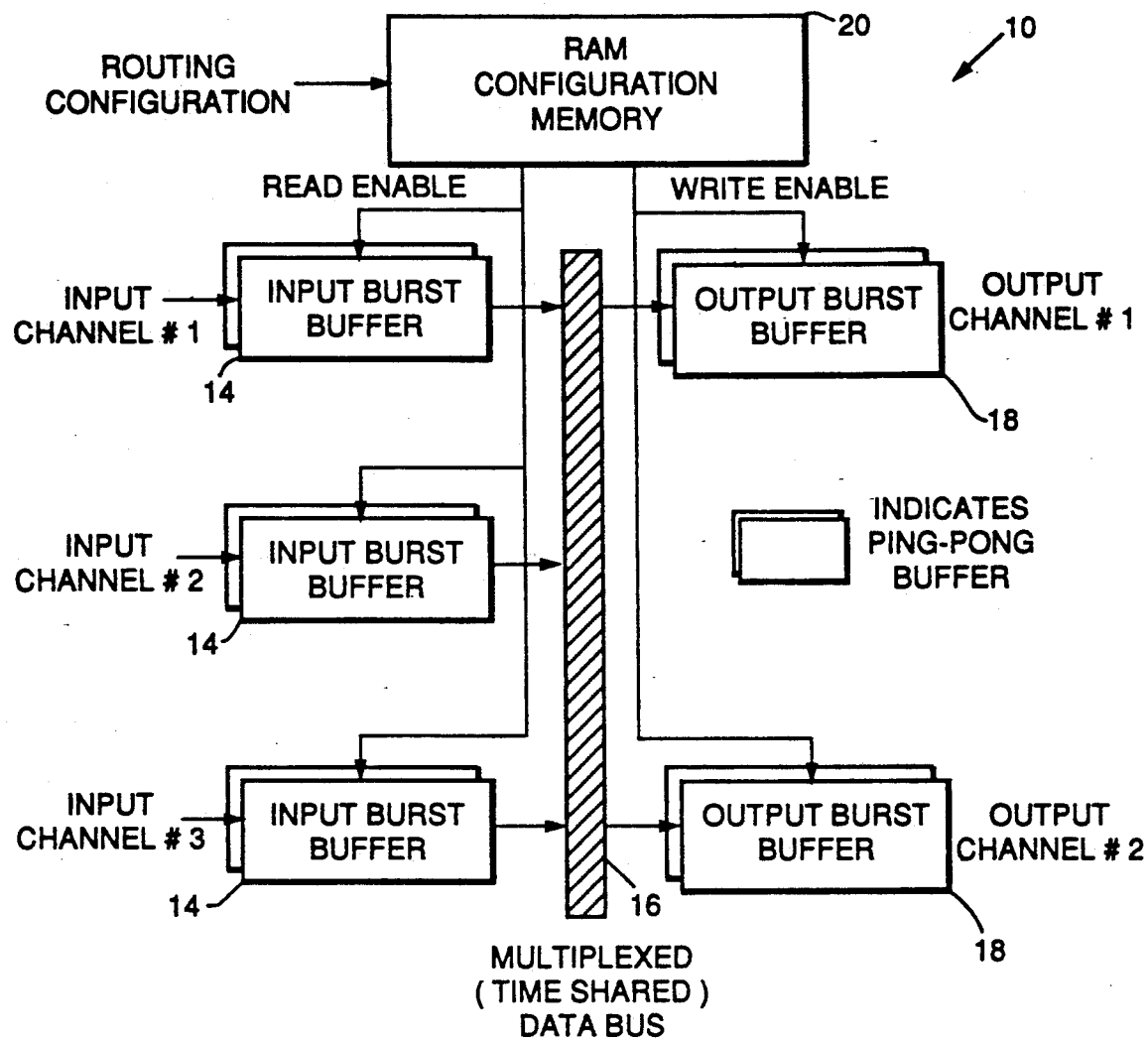
FIG. 1.
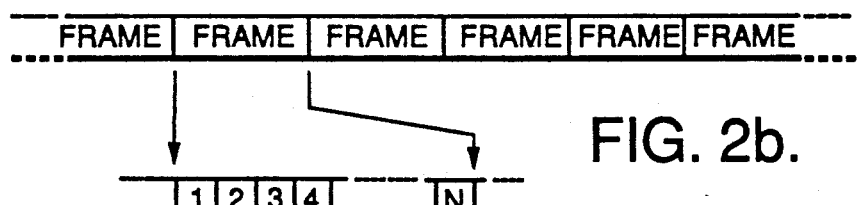
FIG. 2a.
FIG. 2b.
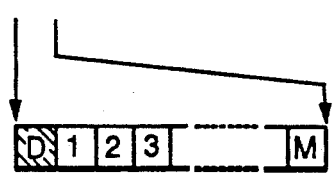
FIG. 2c.

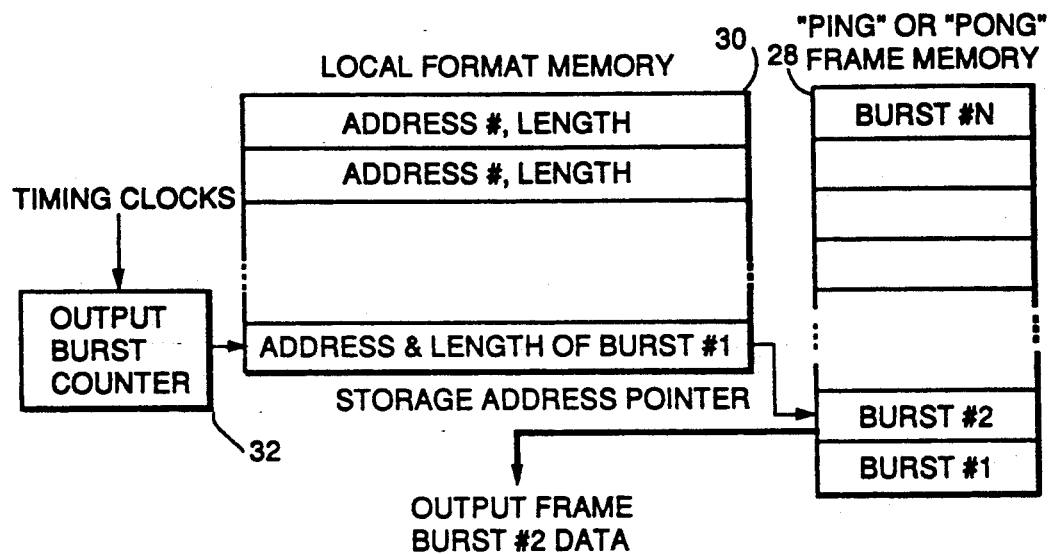
FIG. 7.
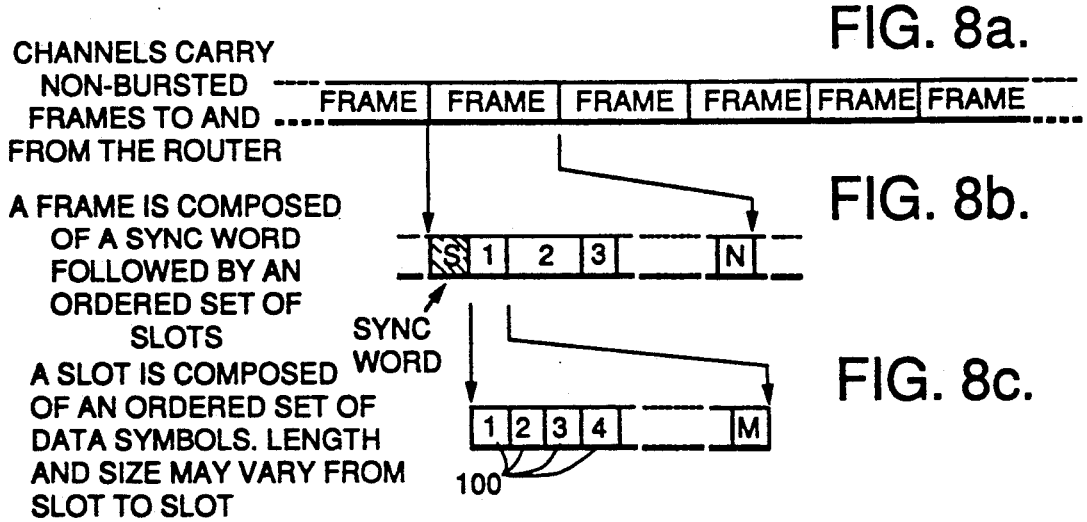
FIG. 8a.
FIG. 8b.
FIG. 8c.

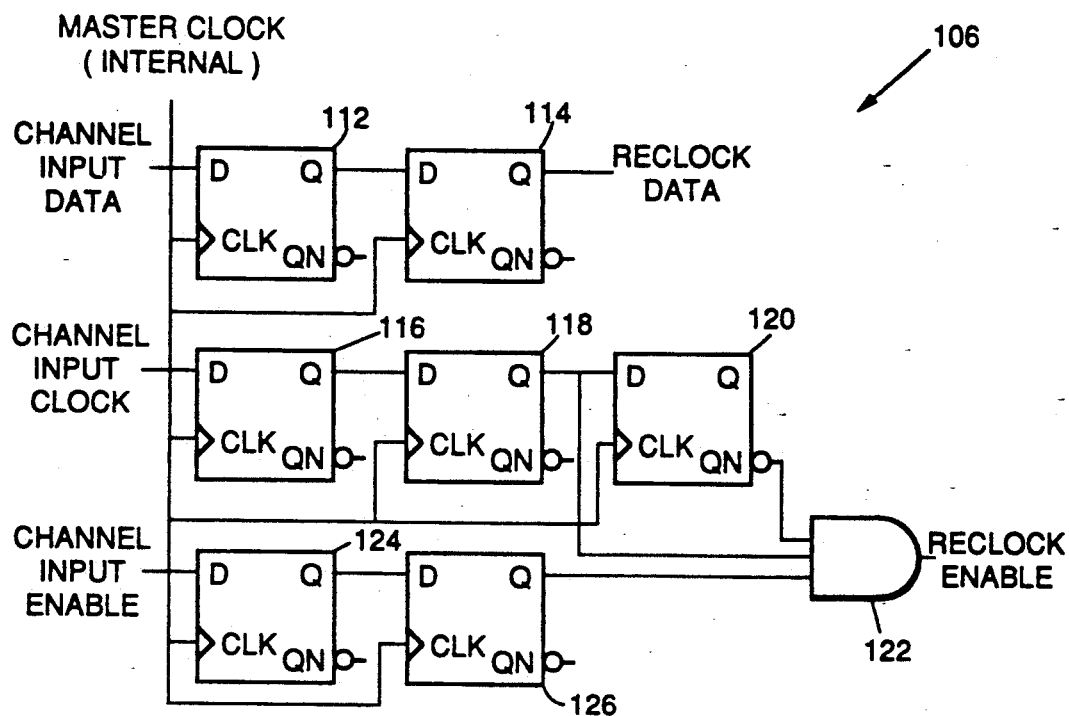
FIG. 13.
FIG. 14.
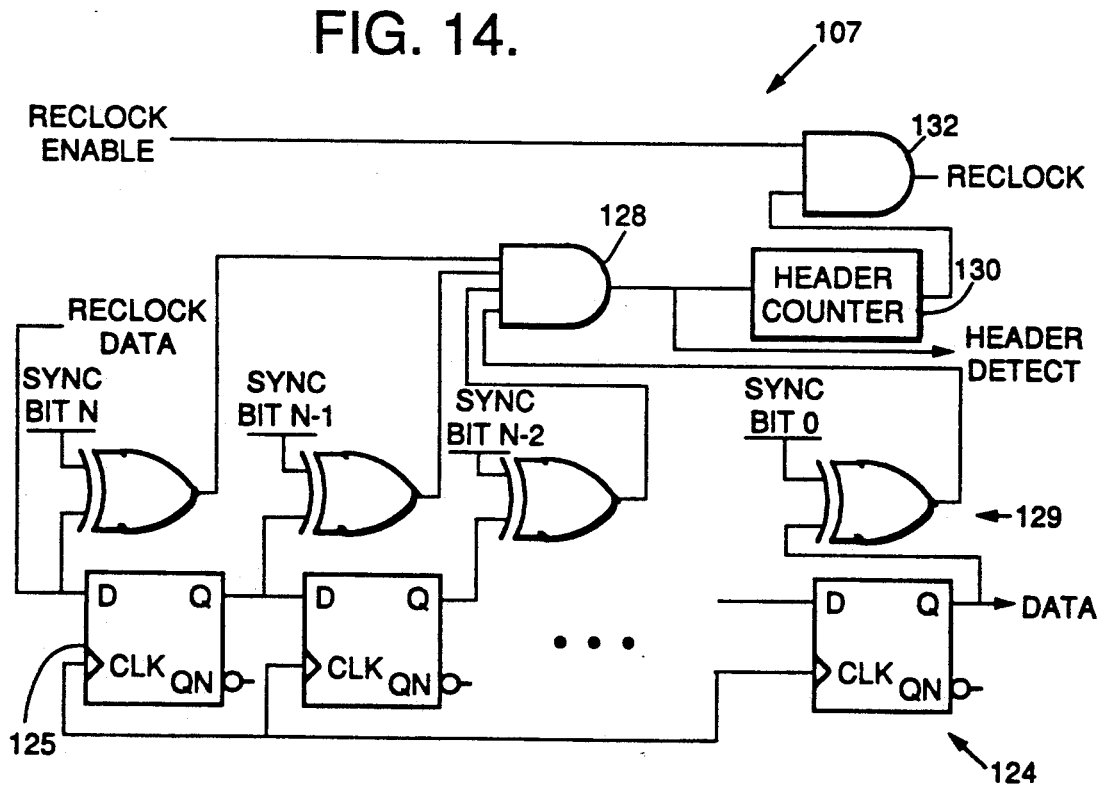

BURSTED AND NON-BURSTED DATA ROUTER

This invention was made with U.S. Government support under a contract awarded by the U.S. Government. The U.S. Government has certain rights in this invention.

BACKGROUND OF THE INVENTION

1. Field of the Invention

The present invention relates to communication systems. More specifically, the present invention relates to data routing systems.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

A data router is a device that accepts data in one or more formats from one or more input channels and routes the data to one or more output channels in one or more formats. A bursted data router is a data router with input and output channels formatted into groups of data symbols called bursts. Bursts are usually grouped into time-division multiplexed frames, with each burst in a frame numbered from 1 to N, for purposes of routing identification.

Routing takes place when a burst is moved from its source, e.g., input channel 1, 2 or 3 and input burst number 1 to N, to its destination, e.g., output channel 1 or 2 and output burst number 1 to N.

In more complex applications, each channel may carry different types of bursts, with each burst type having a characteristic length (number of symbols per burst) and period (time duration of each burst). Output bursts may be constructed of one or more input bursts, or just a fraction of an input burst. In the general case, a bursted data router must translate incoming data bursts into the required output burst format.

Input channels provide formatted data bursts to the router and output channels from the router provide formatted data bursts to connected communications devices such as transmission lines, modulators, and eventually to demultiplexers. One router output channel may eventually connect to many communications devices. Demultiplexers connected to the router output examine a specific area of a frame to extract the burst carrying data of interest. These devices generally expect the burst to be in a specific format. The router therefore functions as a multi-position switch and format translator, directing input data to its desired destination device and translating it into a specified format.

Bursted data routers take advantage of the known, predetermined period of each input burst to simplify routing. A small range of acceptable, selectable burst periods, lengths and timing are determined during router design. Typically, incoming bursts are timed such that their boundaries (where they start and stop in time) are aligned. By aligning incoming burst boundaries, access of each input burst to an output channel can be precisely and simply scheduled to avoid conflicts with other bursts. All incoming bursts arriving during the same burst period are accumulated in burst-sized input buffers. During the following burst period, the input buffers take turns accessing (transferring their data to) output channels. Each input buffer is assigned a fixed time interval within a burst period in which to access the output channels. Thus, collisions between two input bursts simultaneously trying to access the same output channel are avoided.

The restriction of the conventional bursted data router, to processing data formatted into time-aligned bursts, limits its application to rigidly controlled communications links. Many applications, such as satellite links, have non-bursted data with varying timing on some channels while other channels are bursted and time-aligned. In such applications, the need exists for a data router capable of routing bursted and non-bursted data.

SUMMARY OF THE INVENTION

The need in the art is addressed by the present invention which in a most general sense is a data router for receiving input data, having a timing characteristic, and transmitting output data that is either bursted or non-bursted. The non-bursted data comprises frames of data with each frame comprising slots of data, each slot having a position and a number. The invention provides translation between bursted and non-bursted formats and includes an input buffer circuit for receiving input data from an input channel and storing the input data as the input data is received from the input channel. An output buffer circuit is included for formatting the stored input data, translating between bursted and non-bursted data formats and outputting the formatted and translated data to an output channel. A sequencer routing controller circuit controls the operation of the input buffer circuit and output buffer circuit.

This invention allows both bursted and non-bursted data to be freely routed between input and output channels of both types. The addition of non-bursted data routing capability does not interfere with or reduce normal burst routing capabilities. This invention provides for (1) the time alignment of inconveniently located non-bursted frame boundaries, (2) collision-free scheduling for the routing of irregularly sized and timed groups of data symbols, called slots, and (3) reformatting of slotted data into bursted data.

BRIEF DESCRIPTION OF THE DRAWINGS

FIG. 1 is a block diagram of an exemplary data router.

FIG. 2(a)–2(c) show the structure of an exemplary bursted channel. FIG. 2(a) shows multiple frames in a single channel. FIG. 2(b) shows an ordered set of bursts within a frame. FIG. 2(c) depicts an ordered set of data symbols within a burst with a lead-in of unused dead time shown at D.

FIG. 7 is a block diagram of an exemplary output buffer local format memory.

FIG. 8(a)–8(c) are exemplary structures of a non-bursted input channel. FIG. 8(a) depicts a single channel carrying multiple frames of non-bursted data. FIG. 8(b)

shows each non-bursted frame as including a sync word S followed by an ordered set of N slots of varying lengths. FIG. 8(c) shows that each slot is composed of an ordered set of data symbols.

FIG. 13 illustrates an arrangement for synchronizing incoming non-bursted data to the router master clock using a series of D-type flip-flops.

FIG. 14 illustrates a sync detector utilized in the present invention.

DESCRIPTION OF THE INVENTION

Figure 3:
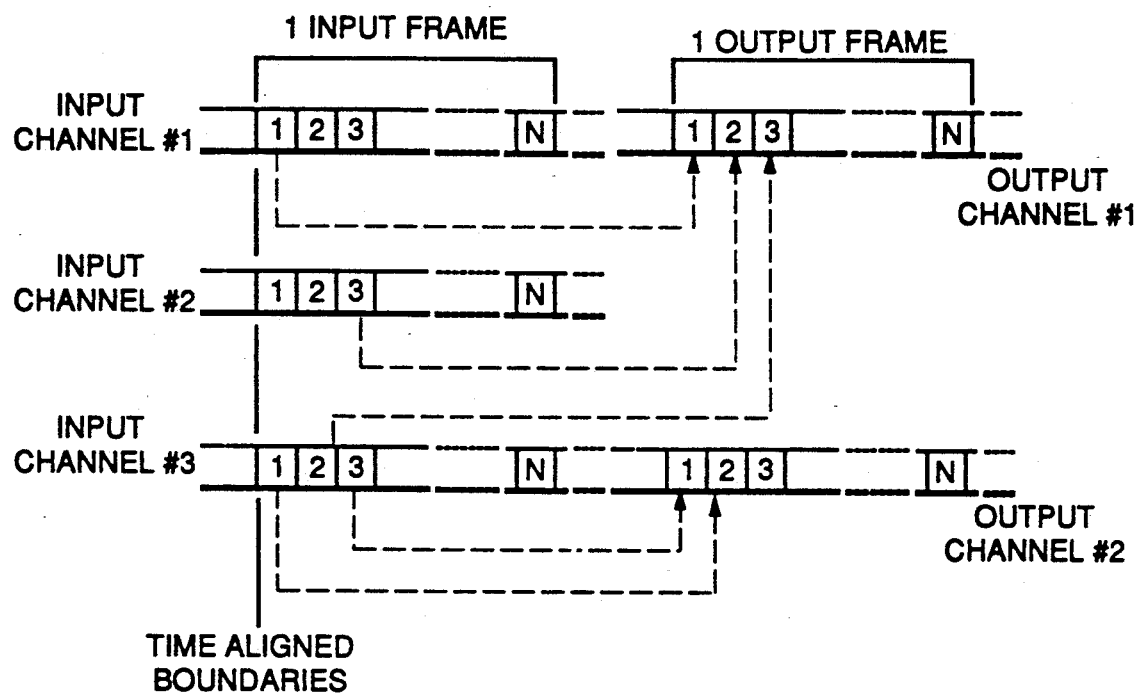
FIG. 3 is a simple diagram illustrating the routing of an exemplary burst.

FIG. 1 is a block diagram of an exemplary bursted data router 10. The router 10 includes a plurality of input burst buffers 14 connected to a respective input channel. Each input buffer 14 has its output connected to a multiplexed data bus 16. Each input buffer 14 is shown as a ping-pong buffer. In the present invention, input buffers are generally ping-pong in design, so that they can accept incoming channel data while simultaneously transferring previously accumulated data to output channels. Ping-pong memory buffers are composed of two physical memory banks; one bank accepts input channel data while the other provides data to an output process. At the end of each burst period the memory banks switch roles and the process continues.

A plurality of output burst buffers 18 each have their input connected to the data bus 16. The output buffers 18 are also shown as ping-pong buffers. The input burst buffers 14 are read enabled by a RAM configuration memory 20 and the output burst buffers 18 are write enabled by the RAM configuration memory 20.

A bursted data router 10 is a data router whose input and output channels are formatted into groups of data symbols called bursts. Bursts are usually grouped into time-division multiplexed frames, with each burst in a frame numbered from 1 to N, for purposes of routing identification. The structure of an exemplary bursted channel is shown in FIGS. 2(a)-2(c). FIG. 2(a) shows multiple frames in a single channel. FIG. 2(b) shows an ordered set of bursts within a frame. FIG. 2(c) depicts an ordered set of data symbols within a burst with a lead in of unused dead time shown at D.

As shown in the simple example of FIG. 3, routing takes place when a burst is moved from its source, input channel 1, 2 or 3 and input burst number 1 to N, to its destination, output channel 1 or 2 and output burst number 1 to N.

In more complex applications, each channel may carry different types of bursts, with each burst type having a characteristic length (number of symbols per burst) and period (time duration of each burst). Output bursts may be constructed of one or more input bursts, or just a fraction of an input burst. In the general case, a bursted data router must translate incoming data bursts into the required output burst format.

Input channels provide formatted data bursts to the router and output channels from the router provide formatted data bursts to connected communications devices such as transmission lines, modulators, and eventually to demultiplexers. One router output channel may eventually connect to many communications devices. Demultiplexers connected to the router output examine a specific area of a frame to extract the burst carrying data of interest. These devices generally expect the burst to be in a specific format. The router therefore functions as a multi-position switch and format translator, directing input data to its desired destination device and translating it into a specified format.

Figure 4:
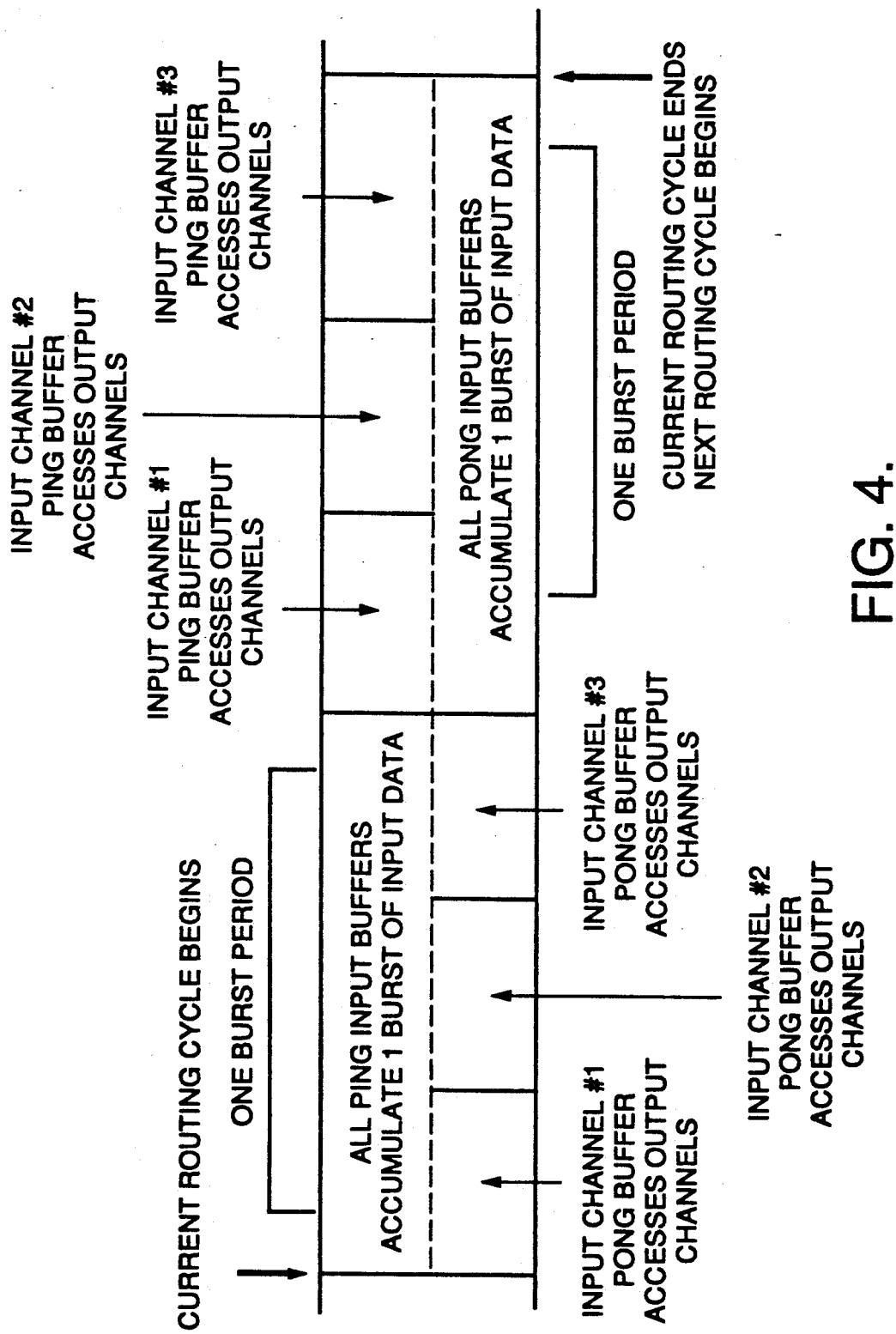
FIG. 4 shows one cycle of a scheduled, cyclic routing process.

Bursted data routers take advantage of the known, predetermined period of each input burst to simplify routing. A small range of acceptable, selectable burst periods, lengths and timing are determined during router design. Typically, incoming bursts are timed such that their boundaries (where they start and stop in time) are aligned as shown in FIG. 3. By aligning incoming burst boundaries, access of each input burst to an output channel can be precisely and simply scheduled to avoid conflicts with other bursts. All incoming bursts arriving during the same burst period are accumulated in burst-sized ping-pong input buffers. During the following burst period, the input buffers take turns accessing (transferring their data to) output channels. Each input buffer is assigned a fixed time interval within a burst period in which to access the output channels. Thus, collisions between two input bursts simultaneously accessing the same output channel are avoided. An example of this scheduled, cyclic routing process is shown in FIG. 4.

Output channels generally accept and store input bursts in a ping-pong frame buffer. The frame buffer generally has specific storage locations reserved for each active input burst of every input channel that occurs in a single input frame. Output channel burst storage proceeds for one frame period at the end of which the frame buffer swaps ping and pong memory bank roles and provides the newly stored bursts to channel outputs. Output frames are composed and formatted by reading out memory locations in a programmed or hardwired order and rate.

All routing operations are generally controlled by the configuration memory 20. During operation, an address counter 22 (see FIG. 5) increments sequentially through each storage address in the configuration memory 20. Configuration memory storage locations generally specify a source input buffer and the destination output buffer(s) of a received burst. The combination of a configuration memory 20 and address counter 22 controlling this process is commonly called a configuration sequencer 24. An example block diagram of a configuration sequencer is given in FIG. 5.

Figure 6:
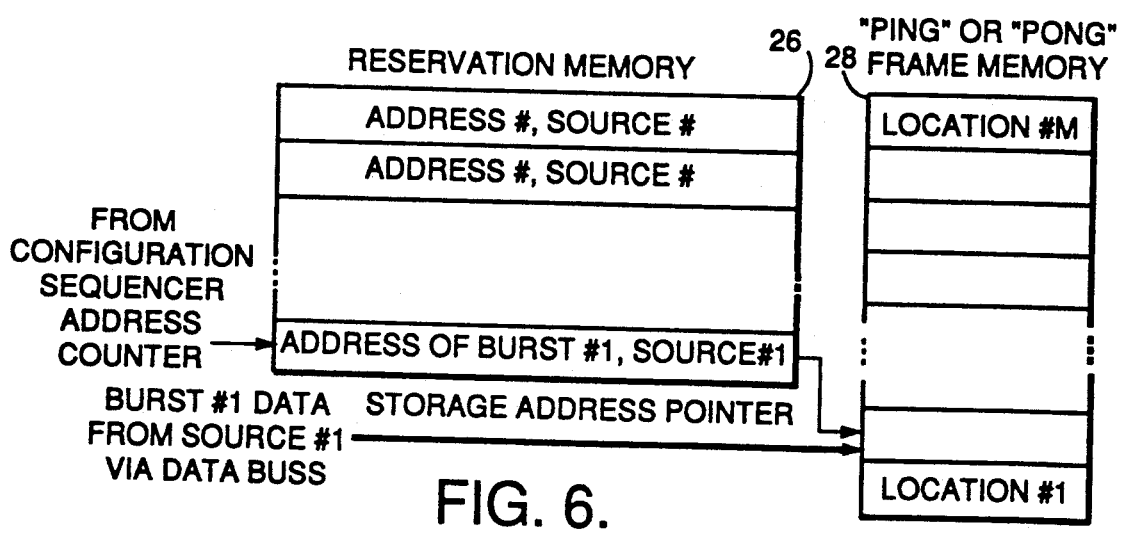
FIG. 6 is a block diagram of an exemplary local reservation memory in an output buffer.

Each output buffer 18 contains a local reservation memory 26 that specifies the correct storage location of a transferred burst. An example block diagram of a local reservation memory 26 in an output buffer 18 is shown in FIG. 6. The output buffer 18 will generally use the configuration sequencer address counter 22 as an address to the local reservation memory 26 holding the address in frame memory 28 at which to begin storing the burst. After all input bursts for one frame are stored in frame memory 28, control of the frame memory 28 is transferred to a local frame format memory.

A block diagram of an exemplary local format memory 30 of an output buffer 18 is shown in FIG. 7. A burst counter 32 incrementing sequentially through output frame burst numbers addresses the local frame format memory 30 which contains the storage location of stored input bursts and their output format. Stored input bursts may be provided to the output channel in any order and format, under the control of the local format memory 30.

Non-bursted frames generally begin with a unique bit pattern called a sync word. The sync word allows the device receiving the non-bursted channel to determine the start of a frame by performing a bit-by-bit compare on the data stream with the expected sync word pattern. In a similar fashion to the bursted channel, the frame is divided into groups of data symbols called slots. Unlike bursts, slots can vary in length and duration and may or may not contain dead time at their start.

An exemplary structure of a non-bursted input channel is shown in FIG. 8(a)–8(c). FIG. 8(a) depicts a single channel carrying multiple frames of non-bursted data. FIG. 8(b) shows each nonbursted frame as including a sync word S followed by an ordered set of N slots. As shown in FIG. 8(c), each slot 100 is composed of an ordered set of data symbols. The length and size of the symbols may vary from slot to slot.

Figure 9:
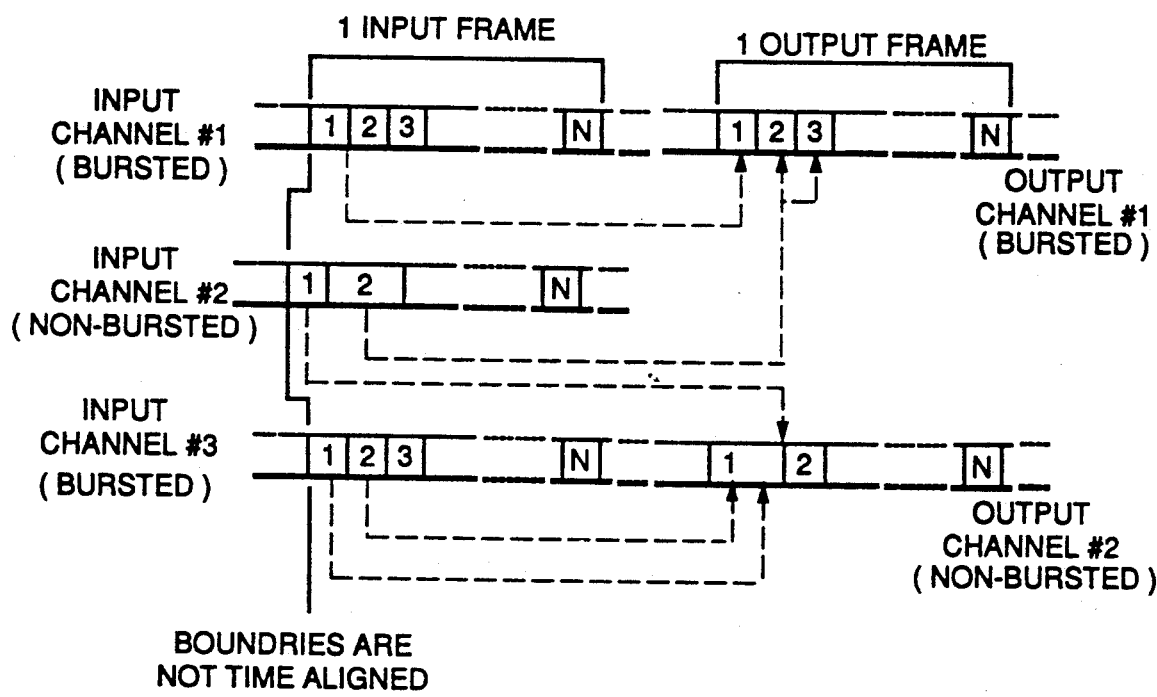
FIG. 9 depicts a routing example containing both bursted and non-bursted data.
Figure 10:
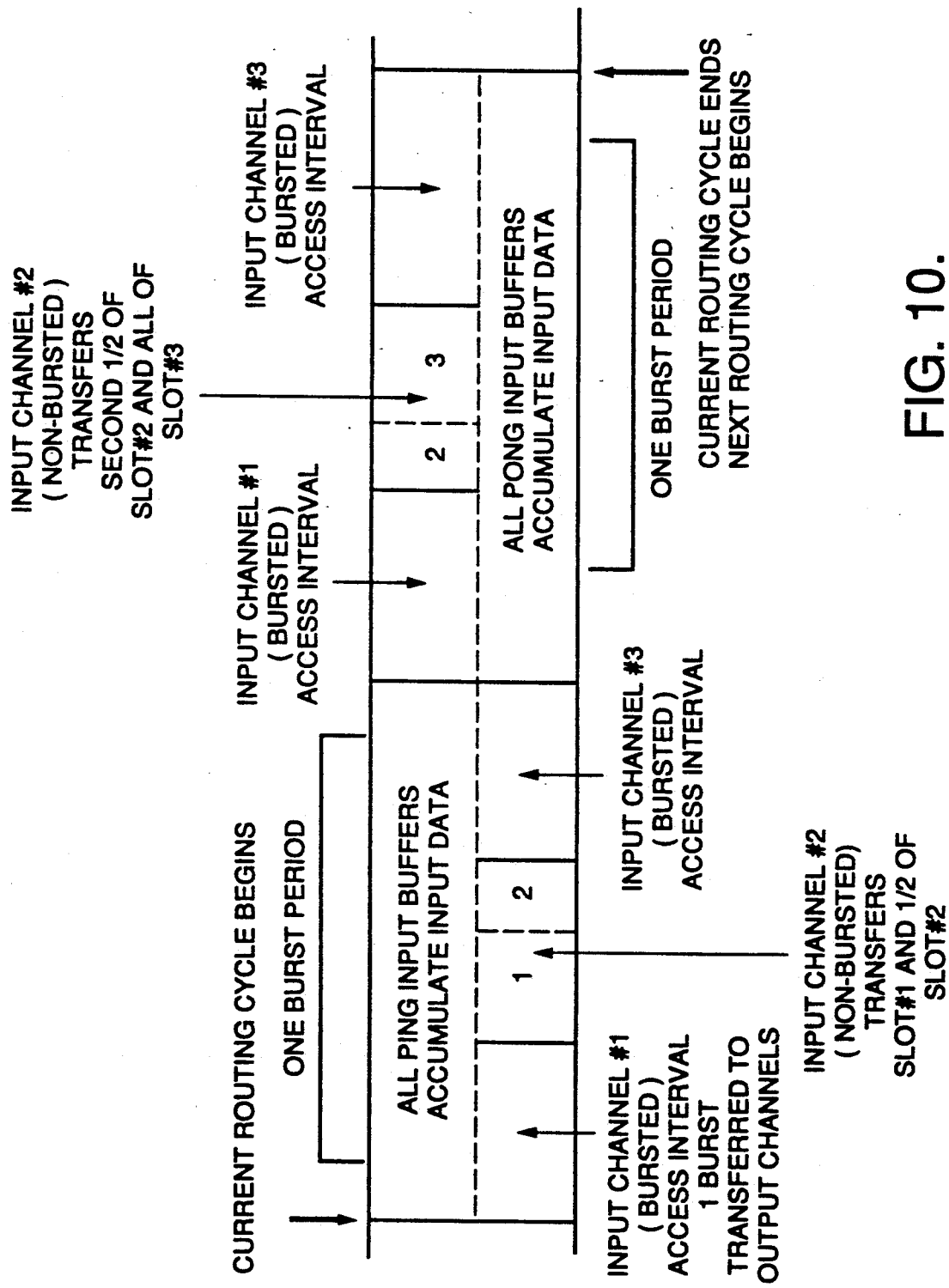
FIG. 10 shows one cycle of a bursted/non-bursted routing schedule.

FIG. 9 depicts a routing example containing both bursted and non-bursted data. Since non-bursted frame and slot boundaries are not aligned with bursted frame and burst boundaries, it cannot be guaranteed that a slot of data will be fully received before a new routing cycle begins. (See FIG. 4.) The bursted router expects that all burst data will be received during a burst period. The non-bursted data router cannot guarantee this on non-bursted channels and therefore must have the ability to route partial slots during a routing period. To do so, the non-bursted router must keep track of the slot number it is on, the amount of the slot that has been routed and the number of the next slot to be routed. When the routing of a slot is interrupted by the end of the routing cycle, the non-bursted router must resume routing of the slot during the next cycle. In addition, in some cases, the routing of a slot will be completed during the middle of the access interval assigned to the input channel. In this case, the non-bursted router must select new destinations and begin routing the next slot, without waiting for a new routing cycle. A routing schedule example illustrating this situation is shown in FIG. 10.

Figure 11:
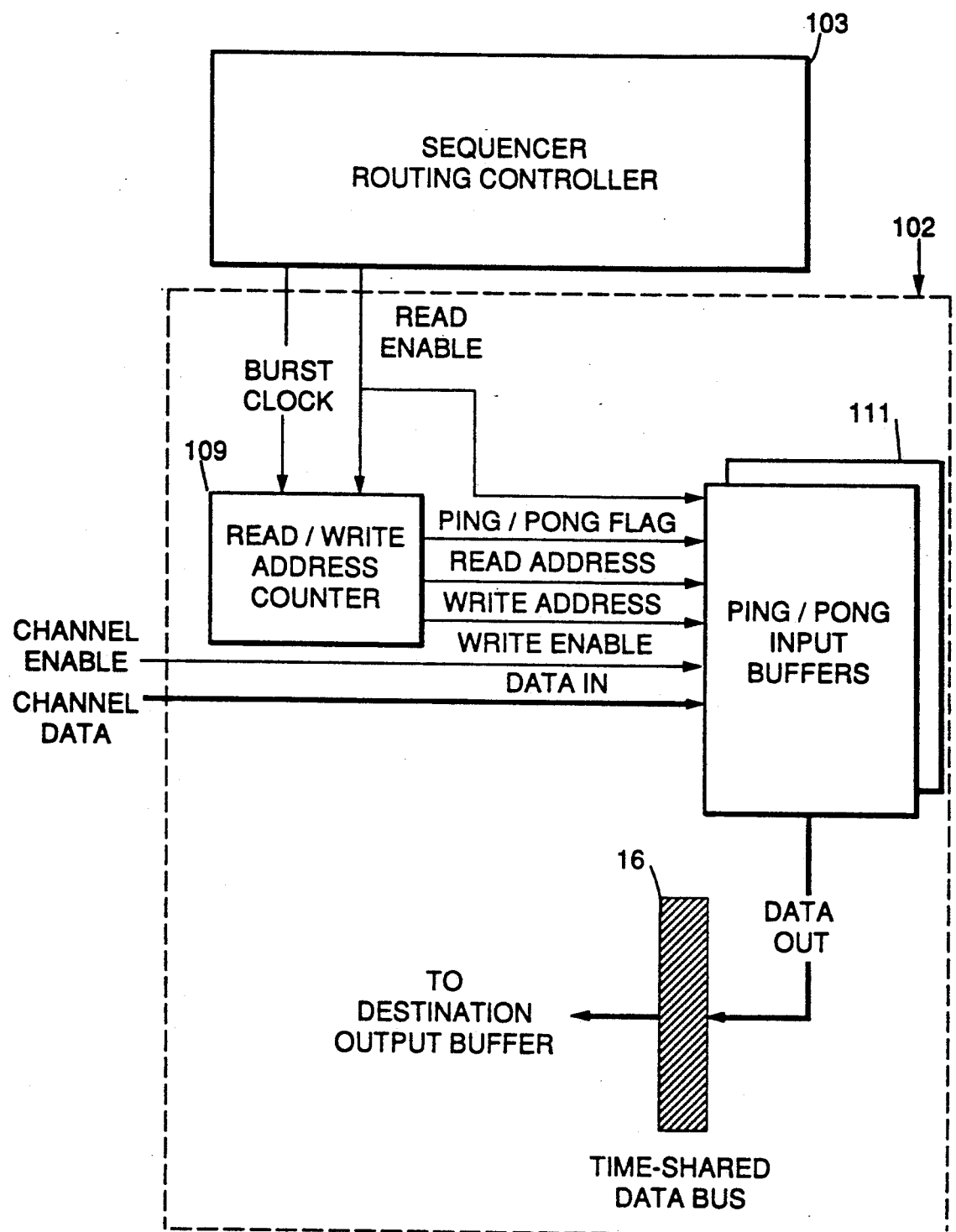
FIGS. 11 and 12 are block diagrams of bursted and non-bursted input buffers, respectively.
Figure 12:
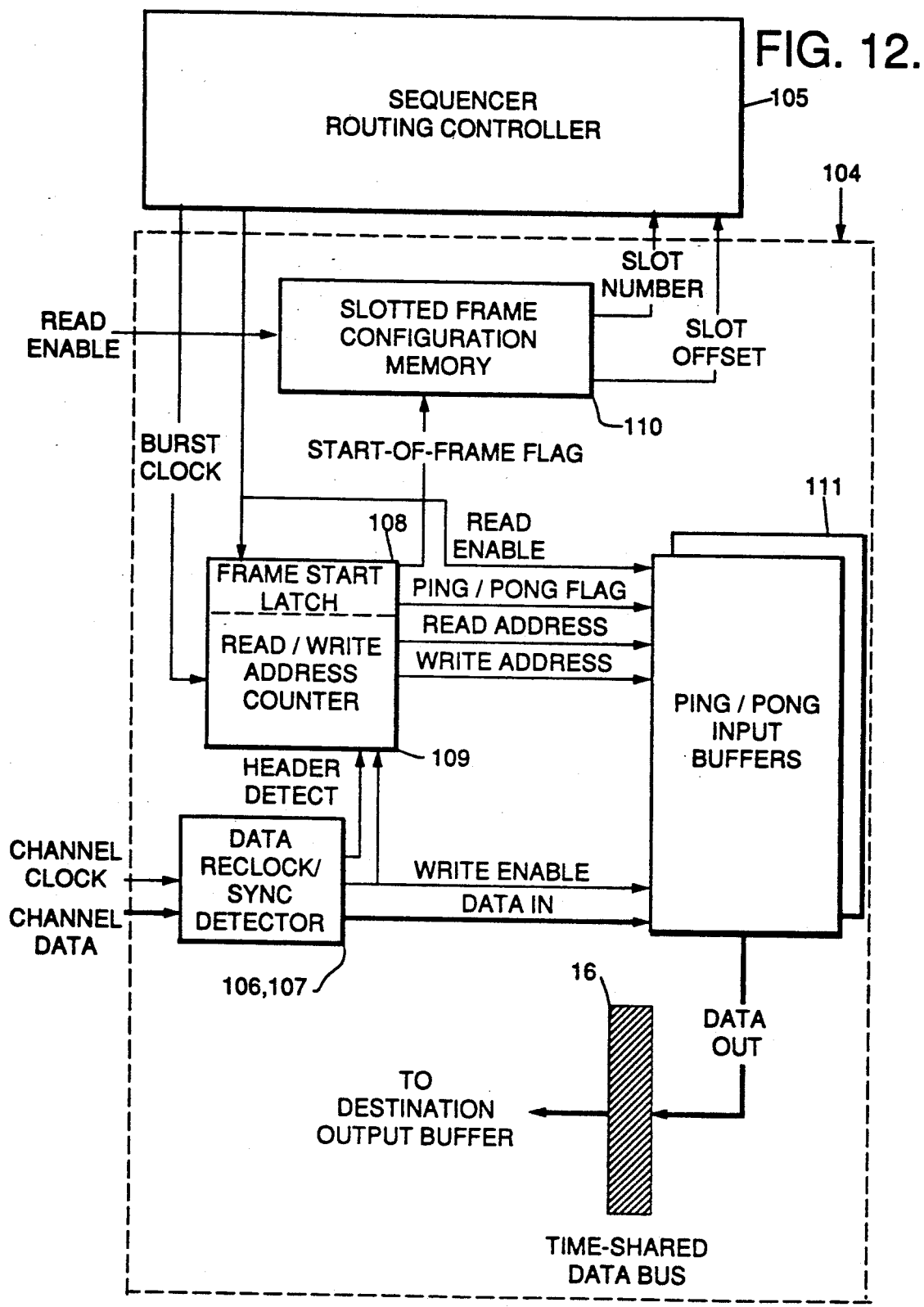

FIGS. 11 and 12 are block diagrams of a bursted input buffer 102 and a slotted non-bursted input buffer 104, respectively. The bursted input buffer 102, of FIG. 11, includes a read/write address counter 109 and ping-/pong input buffers 111. The non-bursted input buffer 104 of FIG. 12, builds on the core components of the bursted input buffer 102, adding a data reclock circuit 106 and sync detector 107, a frame start latch 108 and a slotted frame configuration memory 110.

The reclock circuit 106 synchronizes incoming non-bursted data to the router master clock. The data reclock circuit, illustrated in FIG. 13, detects a rising edge on the channel clock line when the channel enable is true and generates a reclock enable pulse that is one master clock period in length. Simultaneously, channel data is sampled and reclocked by two flip-flops in series to perform glitch-free synchronization to a router master clock. As shown in FIG. 13, the data reclock circuit 106 is implemented with a series of cascaded D-type flip-flops each of which is clocked by an internal master clock. Channel input data is provided to the input terminal of a first flip-flop 112. This signal is clocked through a second flip-flop 114, arranged in cascade with the first flip-flop 112, which provides a "reclock data" signal at the Q output thereof. A channel input clock signal is input to a third flip-flop 116. This signal is clocked through a fourth flip-flop 118 and a fifth flip-flop 120 connected in cascade. The complementary output QN of the fifth flip-flop 120 is a first input to an AND gate 122. A second input to the AND gate 122 is provided by the Q output of the fourth flip-flop 118. A channel input enable signal is input to a sixth flip-flop 124. This signal is clocked through a seventh flip-flop 126 arranged in cascade with the sixth flip-flop 124. The Q output of the seventh flip-flop 126 is the third input of the AND gate 122. The output of the AND gate is a "reclock enable" signal.

The reclock data and reclock enable signals are passed on to the illustrative sync detector 107 of FIG. 14. The sync detector 107 performs a compare on incoming serial data and detects a specific pattern, (the sync word) that indicates the start of a slotted frame. The sync detector 107 then pulls the write enable line false to disable storage of the header and sets the header detect line true for one master clock period. The net result of this initial processing is to provide a synchronized data stream, stripped of non-payload data headers accompanied by an enable signal that indicates when to store incoming bits.

In the illustrative implementation of FIG. 14, the sync detector 107 includes a plurality of D type flip-flops arranged in cascade with the input to the first flip-flop 125 being the reclock data signal and the output of the last flip-flop 127 being data. The inputs to the flip-flops are exclusive-ORed (XORed) with a respective bit of the sync word by a series of XOR gates 129. The outputs of the XOR gates 129 are ANDed by AND gate 128 to provide a header detect signal. The header detect signal is counted by a counter 130. The output of the header counter 130 is ANDed by a second AND gate 132 with the reclock enable signal from the data reclock circuit 106 to provide an enable signal. Both data and enable signals are passed on to the ping-pong buffer 111 of FIG. 12 for storage.

Figure 15:
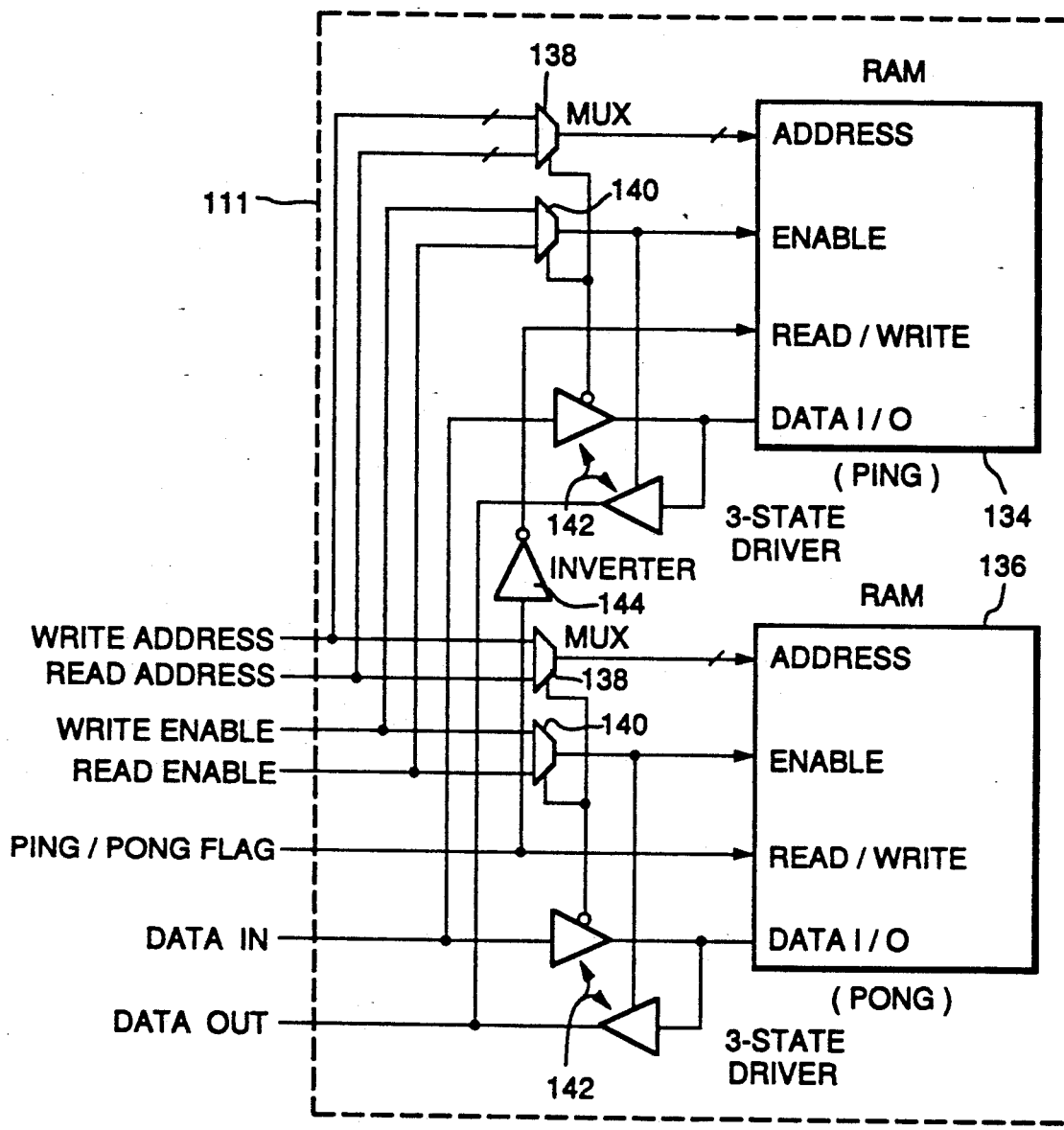
FIG. 15 illustrates detail on the ping-pong buffer implementation of the present invention.

FIG. 15 is a detailed representation of a ping-pong buffer 111. The buffer 111 includes ping and pong RAM memories 134 and 136, respectively. Read and write addresses are provided to the memories 134 and 136 by address multiplexers 138. Read and write enable signals are provided to the memories 134 and 136 by enable multiplexers 140. A tri-state driver 142 is connected to the data I/0 input of each memory 134 and 136. A ping- /pong flag, which provides read/write control to the pong memory 136, is inverted for input to the ping memory by an inverter 144.

Figure 16:
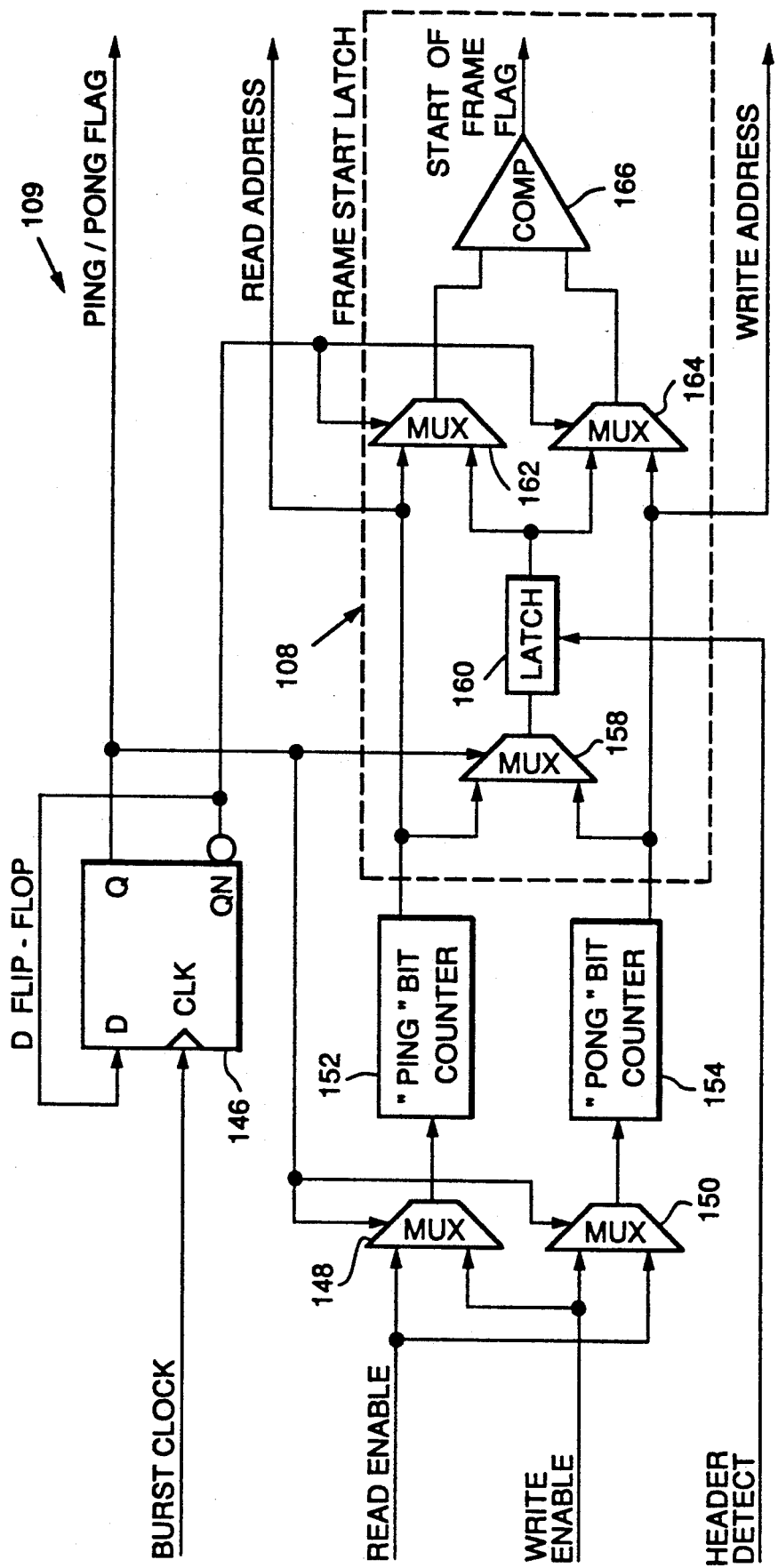
FIG. 16 illustrates a read/write address counter with frame start latch utilized in the present invention.

The read/write address counter 109 of the non-bursted input buffer 104 is shown in detail in FIG. 16 with a detailed representation of the frame start latch 108. The read/write address counter 109 includes a D flip-flop 146, first and second multiplexers 148 and 150, and ping and pong bit counters 152 and 154, respectively. The D flip-flop 146 is clocked by the burst clock signal and provides the ping/pong flag by the Q output thereof. The first and second multiplexers 148 and 150 switch the read and write enable signals into the ping and pong bit counters 152 and 154, respectively, under control of the ping/pong flag. The outputs of the ping and pong bit counters 152 and 154 are input to the frame start latch 108.

The frame start latch 108 includes a first multiplexer 158 which provides the outputs of the bit counters to a latch 160 which stores the address from ping and pong bit counters 152 and 154 respectively where a new frame begins in the ping-pong buffer 111. The first multiplexer 158 is controlled by the ping/pong flag and the latch 160 is enabled by the header detect signal. The output of the latch 160 is input to second and third multiplexers 162 and 164, respectively. The second input to the second and third multiplexers 162 and 164 is provided by the output of the ping and pong bit counters 152 and 154, respectively. The outputs of the ping and pong bit counters are the read and write addresses respectively. The complimentary output (QN) of the flip-flop 146 is fed back to the D input thereof and to the second and third multiplexers 162 and 164 of the frame start latch 108. The outputs of the second and third multiplexers 162 and 164 are compared by a comparator 166. The output of the comparator 166 is a start of frame flag. When data is read out of the ping-pong buffer, the comparator 166 detects the start of a new frame by comparing the latched frame start address in the latch, 160, to the current read address from the ping or pong bit counters 152 and 154, respectively, and resets slot offset and slot counters in the slotted frame configuration memory 110 to zero. (See FIGS. 12 and 17.)

Figure 17:
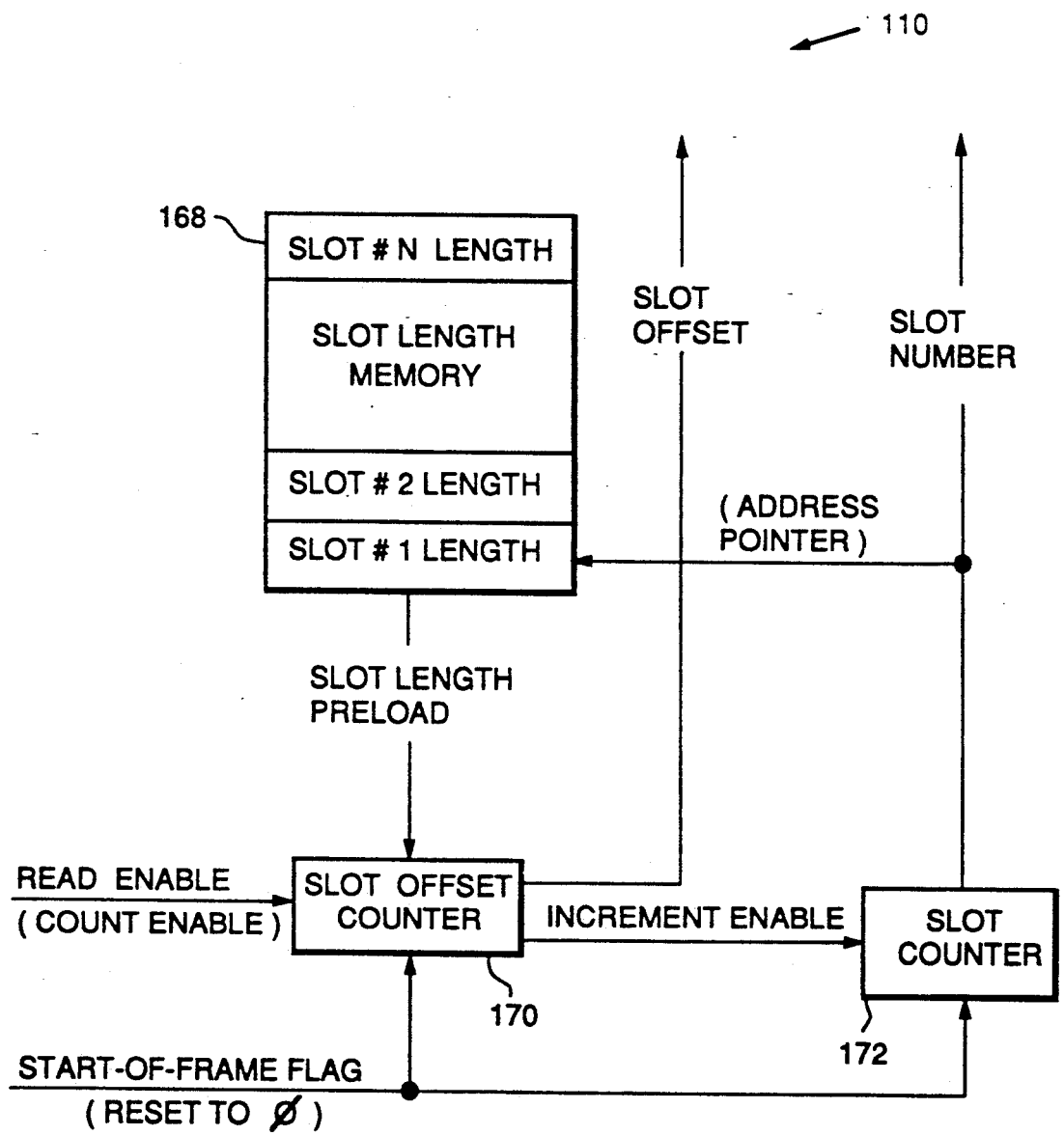
FIG. 17 shows a slotted frame configuration memory utilized in the present invention.

FIG. 17 is a detailed representation of the slotted frame configuration memory 110. The slotted frame configuration memory 110 includes a slot length memory 168, a slot offset counter 170 and a slot counter 172. The slot length memory 168 contains information about each slot that is loaded sequentially into the slot offset counter 170. The slot offset counter 170 is then decremented, as each bit is read out of the ping-pong buffer 111, until it reaches zero. Zero indicates the end of a slot and the slot counter 172 is incremented by one. The slot counter output is then used as an address counter to point to the next values in the slot length memory to load into the slot offset counter. In this manner, the values of the slot and slot offset counters 172 and 170, respectively, always identify the slot and the precise bit of the slot currently being read out of the ping-pong buffer 111. The values of the slot and slot offset counter 172 and 170 are passed to the sequencer routing controller 105 of FIG. 12.

Figure 5:
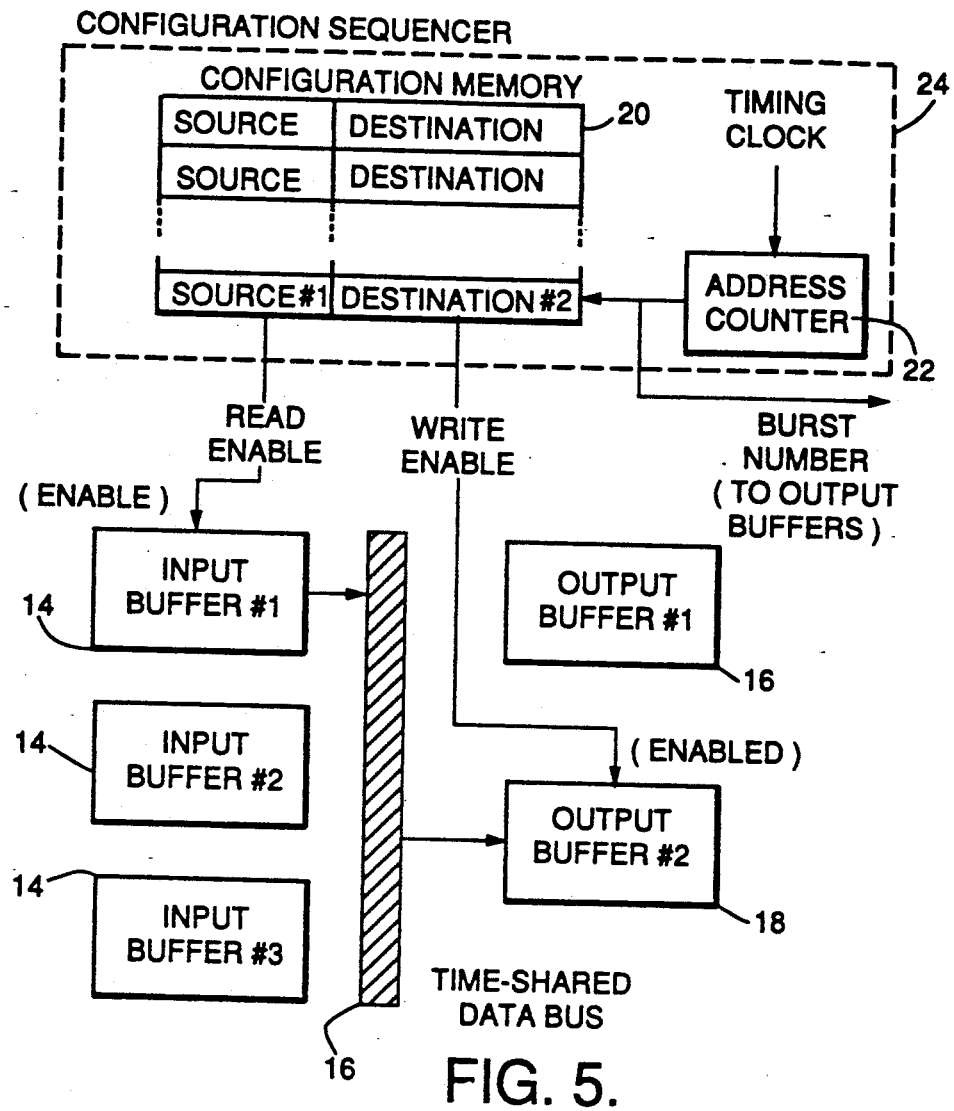
FIG. 5 is a block diagram of an exemplary bursted configuration sequencer.
Figure 18:
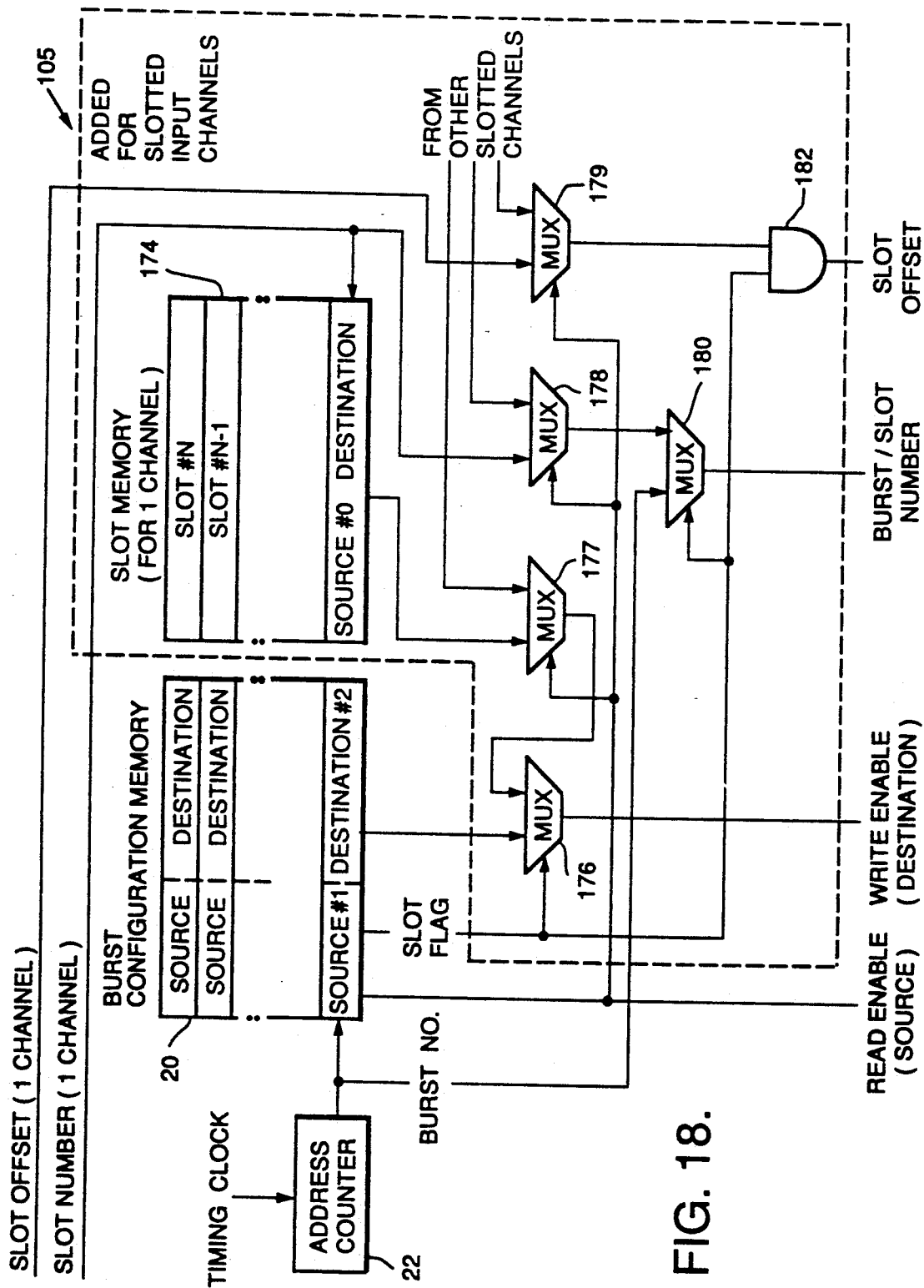
FIG. 18 is a block diagram of a bursted/non-bursted configuration sequencer utilized in the present invention.

As shown in FIG. 18, the bursted/non-bursted configuration sequencer routing controller 105 adds to the bursted sequencer 24 of FIG. 5 an additional slot configuration memory 174 for each non-bursted input channel and multiplexers 176-180 to select among bursted and non-bursted memories. During operation, the sequencer 105 will step through each burst configuration word sequentially, at a pace determined by the fixed timing clock.

In addition to source and destination routing information, the RAM configuration memory 20 is modified to contain a slot flag bit which indicates if the input channel currently being processed is slotted. If non-bursted data is being processed, destination selection is placed under the control of the slot configuration memory 174. Unlike the RAM configuration memory 20, the slot configuration word is selected by an address generated from the slot number of an input buffer. In essence, the slotted input buffer keeps track of the slot number it is transferring, informs the sequencer via the slot number line and thereby selects the correct destination for that slot. The sequencer 105 selects the slot number and slot offset from the currently active input buffer and provides this data to the selected output buffer(s) for use in determining where to store the transferred data. The slot offset is set to zero during bursted data transfers. A read enable line both selects the active input buffer and indicates its identity to the selected output buffer(s).

Figure 19:
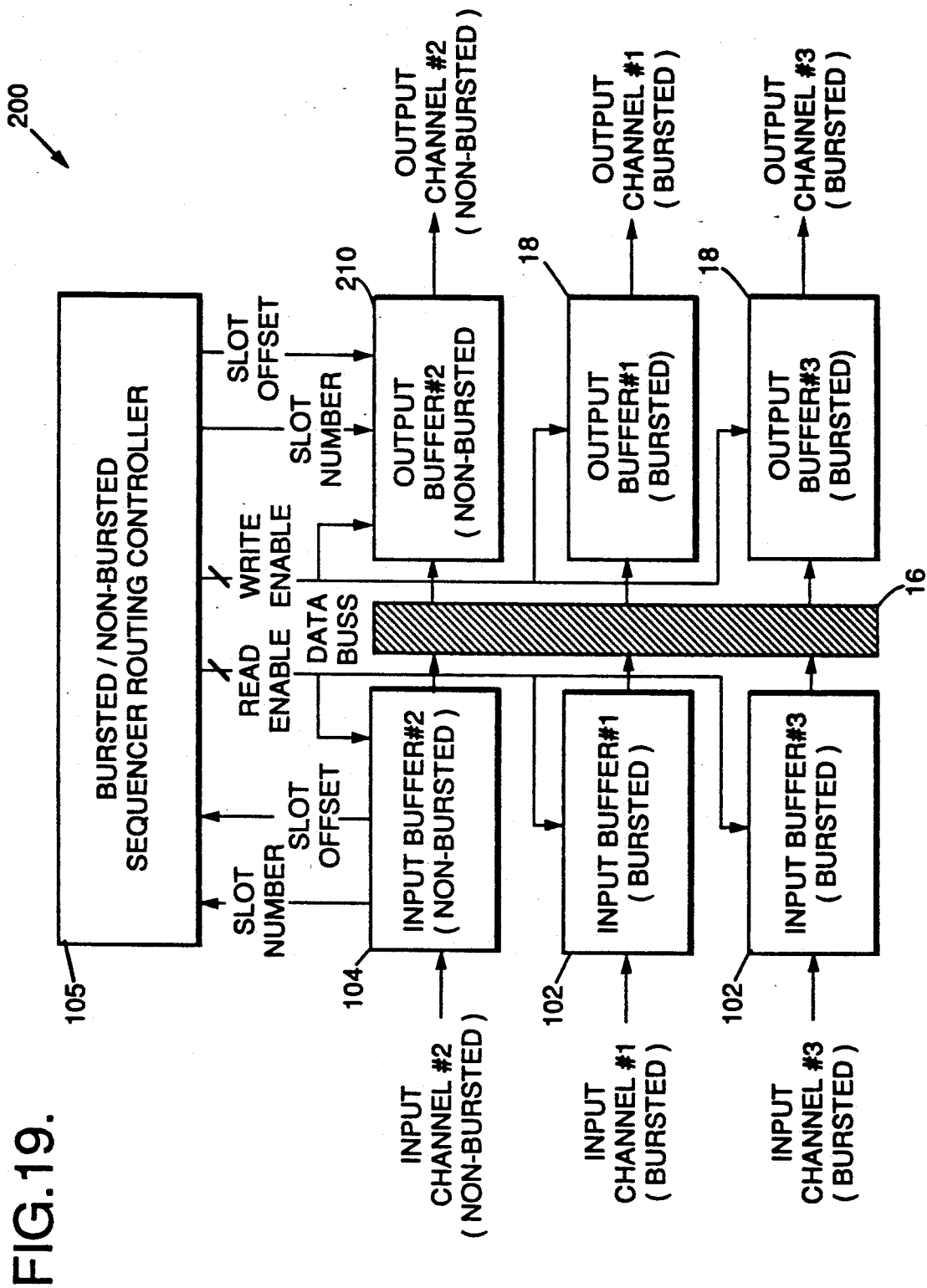
FIG. 19 is an illustrative implementation of a block diagram of a bursted/non-bursted router utilized in the present invention.

FIG. 19 is a block diagram of the bursted/non-bursted router 200 of the present invention. The bursted/non-bursted router 200 includes the bursted/non-bursted sequencer routing controller 105, first and second bursted input buffers 102, a non-bursted input buffer 104, bursted output buffers 18 and a non-bursted output buffer 210.

Figures 20, 21:
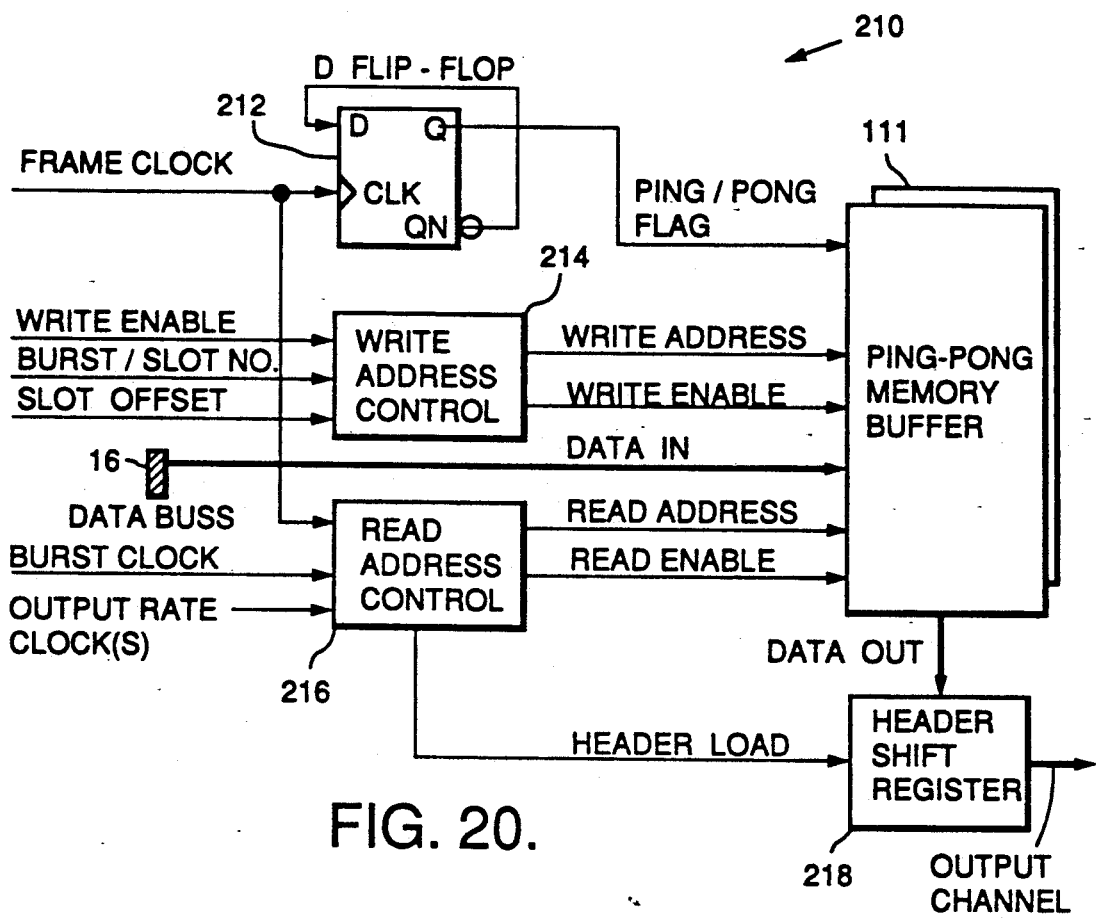
FIG. 20 is a block diagram of the non-bursted output buffer utilized in the bursted/non-bursted router of the present invention.
FIG. 21 illustrates various output buffer data processing combinations.

FIG. 20 is a block diagram of the non-bursted output buffer 210 utilized in the bursted/non-bursted router 200 of the present invention. The output buffer 210 accepts transferred data from the data bus 16 and selection and routing information from the sequencer 105. Note that an output buffer capable of accepting only bursted data requires only the write enable (output buffer selection) signal and the burst number. The output buffer 210, capable of accepting both bursted and non-bursted data, requires the write enable, burst/slot number and the slot offset. As shown in FIG. 20, the output buffer 210 includes a D flip-flop 212, a write address control 214, a read address control 216, a header shift register 218 and a ping-pong memory 111. Incoming data is stored at addresses in the ping-pong memory 111 that are determined by the write address control 214. Likewise, data is read out of the ping-pong memory 111 in a specific order by the read address control 216. The header shift register 218 is used to insert any fixed header information that may be required at the start of an output frame. The flip-flop 212 in a toggle configuration is used to perform ping-pong memory buffer selection as controlled by the frame clock. The ping-pong memory buffer 111 is similar in operation to that used in the input buffers (FIG. 15).

Depending on selection of the appropriate read and write address controller architectures, various combinations of bursted and non-bursted data may be processed by the output buffer 210, as illustrated in FIG. 21.

Figure 22:
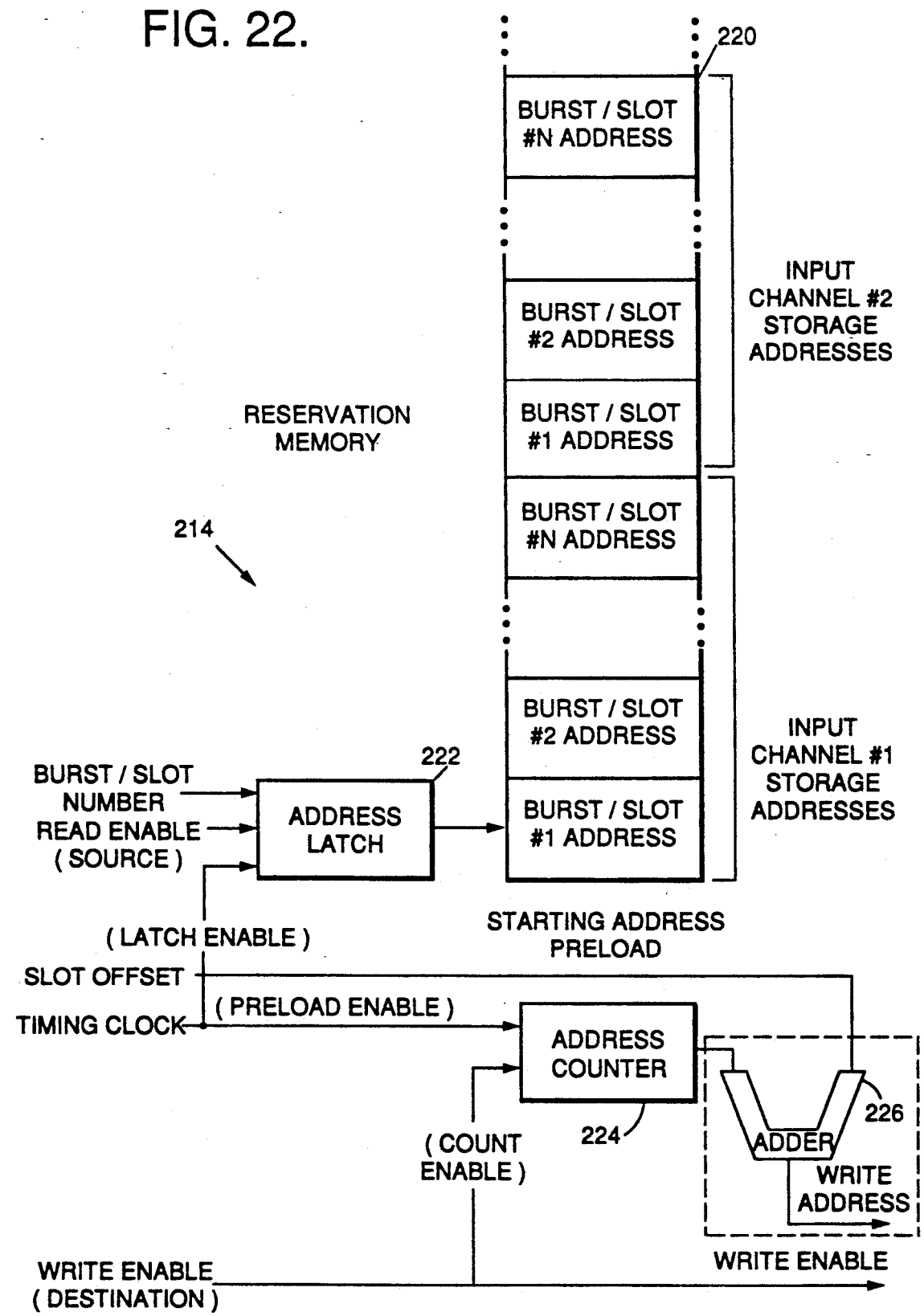
FIG. 22 is a block diagram of a bursted/non-bursted output buffer write address controller block diagram utilized in the present invention.

FIG. 22 is a block diagram of the write address controller 214 of the output buffer 210. The write address controller 214 includes a reservation memory 220, an address latch 222, an address counter 224 and an adder 226. During operation, the address latch 222 concatenates the burst/slot number with the source indicator to form an address referencing a location in the reservation memory 220. The referenced location contains the starting address in the output buffer ping-pong memory at which incoming data will be stored. This starting address is preloaded into the address counter 224 that is then incremented as each data bit is received. The counter output is added to the slot offset from the bursted/non-bursted configuration sequencer, 105, (which is zero for bursted data) and the result is used as a write address for the ping-pong memory 111. The adder 226 and slot offset allow for slots that were incompletely routed during the previous routing period to resume processing at the last address used. Bursted data is, by definition, always completely routed during a routing period and therefore has an offset of zero.

Figure 23:
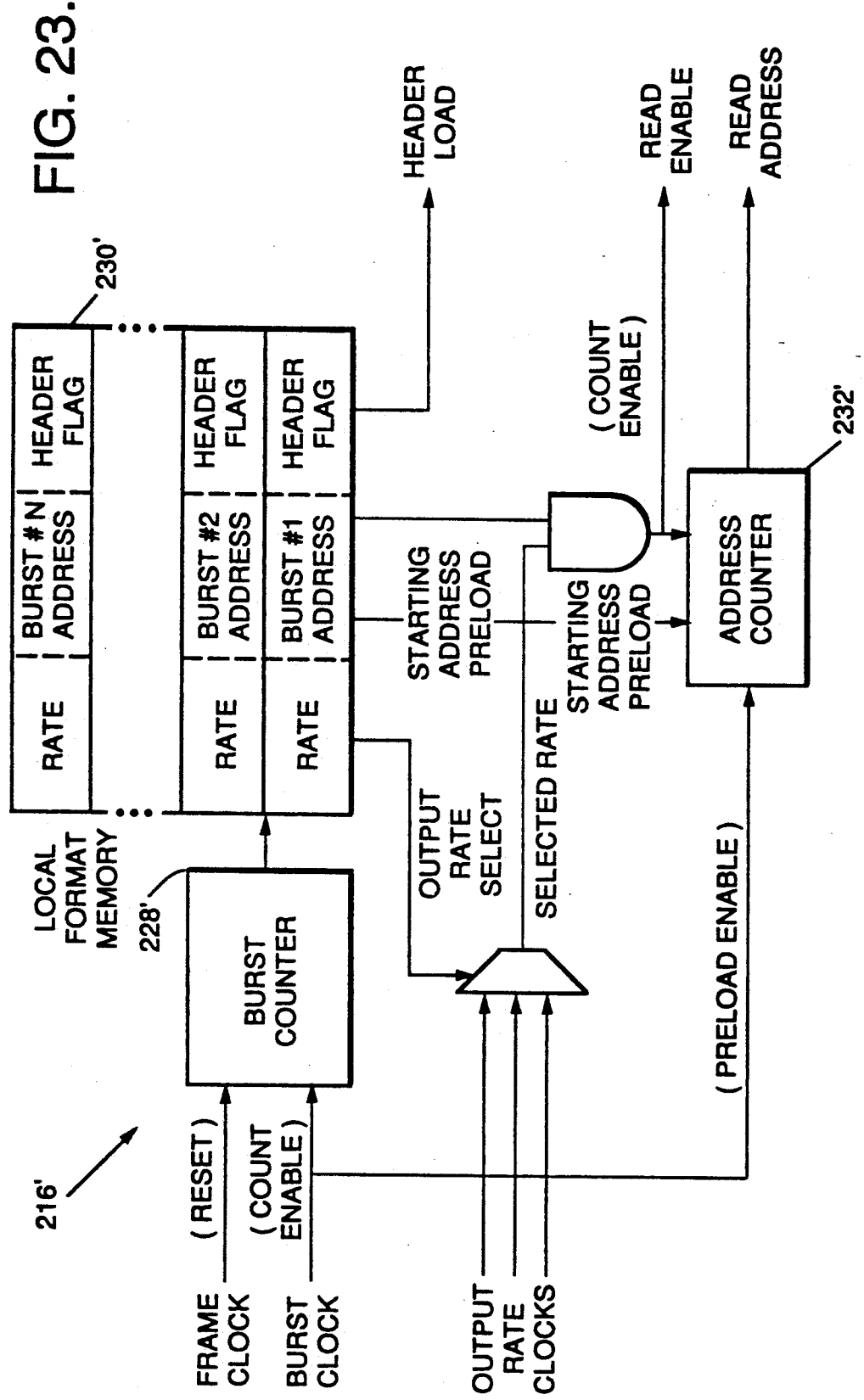
FIG. 23 is block diagram of a conventional bursted read address controller.

FIG. 23 is a block diagram of a conventional read address controller 216'. The read address controller 216' performs formatting of output frames by reading data out of the ping-pong memory in a specific order and with specific timing. On any given output channel, data is either bursted or non-bursted, and each data type requires a different read controller architecture.

In operation, a burst counter 228' increments once for each burst period during a frame period, generating an address to a local format memory 230'. The local format memory 230' contains the starting address in the ping-pong memory 111 of an output burst and also an output rate select indicator and a header load flag. The starting address is preloaded into a ping-pong address counter 232' which is then incremented at a rate chosen by the output rate select line. The ping-pong address counter 232' provides a read address to the ping-pong memory buffer which outputs the indicated data. If the header flag is true during a burst period, then no data is read out of the ping-pong memory and instead a fixed frame header is inserted. Each output burst has the same duration, but may contain a different number of bits, resulting in an output bit rate that may be different from burst to burst. The output bit rate is determined by an output rate clock; each output rate clock corresponds to a specific number of bits in a burst. The output rate for each burst is selected by the rate field in the local format memory 230'.

Figure 24:
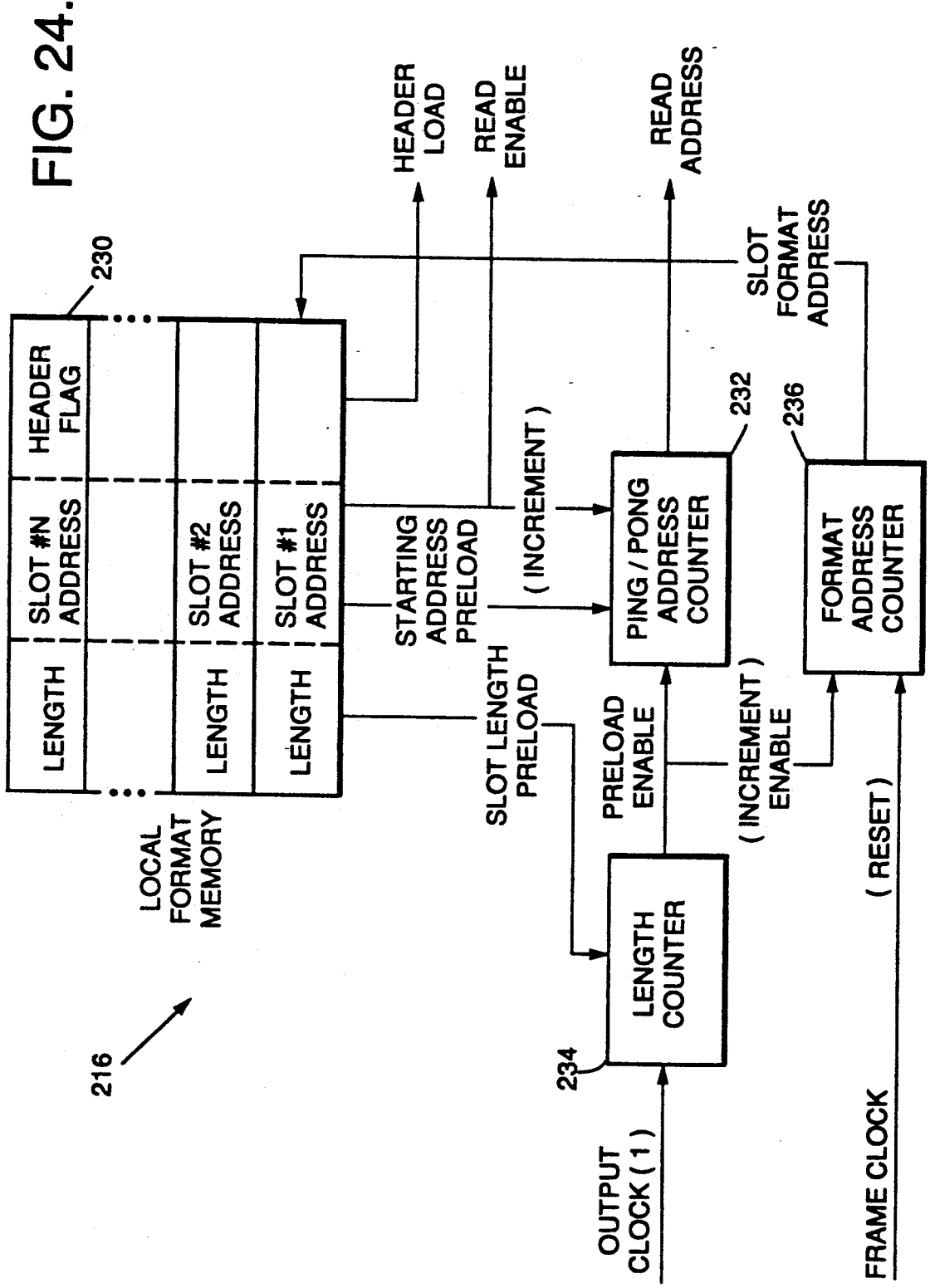
FIG. 24 is a block diagram of a non-bursted read address controller utilized in the present invention.

FIG. 24 is a block diagram of the non-bursted read address controller 216. The non-bursted read controller 216 operates differently than the bursted controller 216'. Unlike bursted frames, non-bursted frames are generally output at a fixed rate and the non-bursted read address controller 216 uses only one output rate clock. Since the output clock is fixed for non-bursted frames, slots containing different numbers of bits have different durations. These durations do not necessarily correspond to burst periods and therefore the burst clock cannot be used to increment the format address counter. Since every slot may be of a different length and hence duration, slot length data is stored in the local format memory for use as a preload into a slot length counter 234.

During operation, the slot length counter 234 is decremented as each slot bit is read out. When the slot length counter 234 reaches zero, it increments a format address counter 236, enables its own preload, and enables the ping-pong address counter 238 preload. After being incremented, the format address counter 236 points to an address in the local format memory 230 holding the start address and length of the next slot. The ping-pong address counter 238 is preloaded with the starting address in the ping-pong memory buffer of a new output slot and begins incrementing at a rate controlled by the output clock. This causes a slot to be read out from the ping-pong memory. In this manner, the read controller 216 formats a frame whose slot boundaries are unrelated to router burst timing.

Since read and write controls are completely independent, the output buffer 210 is able to store a slot of data and read it out in a bursted format, or vice versa, according to the choices listed in FIG. 23.

Thus, the present invention has been described herein with reference to a particular embodiment for a particular application. A significant feature of the invention is in the non-bursted input buffer which provides resynchronization of incoming data to the master clock, synchronization to the incoming frame and the ability to keep track of the incoming slot number and position in the slot.

The novel configuration sequencer includes routing configuration memory space for each non-bursted input channel and circuits to select the non-bursted configuration memory in lieu of the bursted configuration memory when operating on a non-bursted channel. The configuration sequencer also switches slot number and slot offset signals from the input buffer currently being accessed to the output buffer, which uses these signals to determine storage locations.

The output buffer is composed of three major structures: the write address controller, read address controller and ping-pong memory buffer. A write address controller designed for non-bursted data controls the storage of either bursted or non-bursted data. The read address controller is designed either for conventional bursted data or for non-bursted data. The output buffer translates between bursted and non-bursted data formats (and vice versa) by reading data into a random access memory (the ping-pong memory buffer) using the natural input timing (bursted or non-bursted) and reading it out using new timing parameters (bursted or non-bursted). By writing data into the memory in one order and reading it out in another, concatenation, splitting and shuffling or deshuffling of data may be performed.

A significant feature of the invention is in the manner in which the write addresses in the output buffer are derived. In the conventional bursted data router, input and output buffers are independent. In the bursted/non-bursted data router of the present invention, non-bursted input buffers help form the storage address for the output buffer by providing slot and slot offset indicators.

Those having ordinary skill in the art and access to the present teachings will recognize additional modifications, applications and embodiments within the scope of the invention.

It is therefore intended by the appended claims to cover any and all such applications, modifications and embodiments.

Accordingly,

What is claimed is:

1. A data router for receiving input data, having a timing characteristic, and transmitting output data that is either bursted or non-bursted, said non-bursted data comprising frames of data with each frame comprising slots of data, each slot having a position and a number, and for providing translation between bursted and non-bursted formats, said data router comprising:

input buffer means for receiving input data from an input channel and storing said input data as said input data is received from said input channel;

output buffer means for formatting said stored input data, translating between bursted and non-bursted data formats and outputting said formatted and translated data to an output channel; and sequencer routing controller means for controlling the operation of said input buffer means and output buffer means.

2. The invention of claim 1 wherein said data router includes a master clock and said input buffer means includes means for synchronizing said input data to said master clock.

3. The invention of claim 2 wherein said input buffer includes means for providing synchronization of an incoming frame of said input data to said master clock.

4. The invention of claim 2 wherein said input buffer means includes means for tracking the slot number of said incoming data.

5. The invention of claim 4 wherein said input buffer means includes means for tracking the position in said slot of a bit of input data.

6. The invention of claim 1 wherein said output buffer means includes write address controller means for controlling the storage of bursted and non-bursted data therein.

7. The invention of claim 6 wherein said output buffer means includes read address controller means for controlling the output of bursted or non-bursted data therefrom.

8. The invention of claim 7 wherein said output buffer means includes means for translating between bursted and non-bursted data formats by reading data into a memory using the input timing characteristic thereof and reading said data out of said memory using an alternative set of timing characteristics.

9. The invention of claim 1 wherein said input buffer means includes means for facilitating the formation of a storage address for said output buffer means by providing slot number and slot offset thereto.

10. The invention of claim 1 including a plurality of input channels and wherein said sequencer routing controller means includes routing configuration memory space for each non-bursted input channel.

11. The invention of claim 10 wherein said sequencer routing controller means includes means for automatically selecting said routing configuration memory space for a non-bursted input channel in lieu of a bursted configuration memory when operating on a non-bursted channel.

12. The invention of claim 11 wherein said sequencer routing controller includes means for switching slot number and slot offset signals from said input buffer means to said output buffer means.

13. The invention of claim 12 wherein said output buffer means includes means for using said slot number and slot offset signals to determine storage locations.

14. A data router, having a master clock, for receiving input data, having a timing characteristic, and transmitting output data that is either bursted or non-bursted, said non-bursted data comprising frames of data with each frame comprising slots of data, each slot having a position and a number, and for providing translation between bursted and non-bursted formats, said data router comprising:

input buffer means for receiving input data from an input channel and storing said input data as said input data is received from said input channel, said input buffer means including means for synchronizing said incoming data to said master clock and for providing synchronization of an incoming frame of said input data to said master clock;

output buffer means for formatting said stored input data, translating between bursted and non-bursted data formats and outputting said formatted and translated data to an output channel; and sequencer routing controller means for controlling the operation of said input buffer means and output buffer means.

15. The invention of claim 14 wherein said input buffer means further includes means for tracking the slot number of said incoming data.

16. The invention of claim 15 wherein said input buffer means includes means for tracking the position in said slot of a bit of input data.

17. The invention of claim 14 wherein said output buffer means includes write address controller means for controlling the storage of bursted and non-bursted data therein.

18. The invention of claim 17 wherein said output buffer means includes read address controller means for controlling the output of bursted and non-bursted data therefrom.

19. The invention of claim 14 wherein said output buffer means includes means for translating between bursted and non-bursted data formats by reading data into a memory using the input timing characteristic thereof and reading data out of said memory using an alternative set of timing characteristics.

20. The invention of claim 14 wherein said input buffer means includes means for facilitating the formation of a storage address for said output buffer means by providing slot number and slot offset thereto.

21. The invention of claim 14 including a plurality of input channels and wherein said sequencer routing controller means includes routing configuration memory space for each non-bursted input channel.

22. The invention of claim 21 wherein said sequencer routing controller means includes means for automatically selecting said routing configuration memory space for a non-bursted input channel in lieu of a bursted configuration memory when operating on a non-bursted channel.

23. The invention of claim 22 wherein said sequencer routing controller includes means for switching slot number and slot offset signals from said input buffer means to said output buffer means.

24. The invention of claim 23 wherein said output buffer means includes means for using said slot number and slot offset signals to determine storage locations.

25. A data router, having a master clock, for receiving input data, having a timing characteristic, and transmitting output data that is either bursted or non-bursted, said non-bursted data comprising frames of data with each frame comprising slots of data, each slot having a position and a number, and for providing translation between bursted and non-bursted formats, said data router comprising:

input buffer means for receiving input data from an input channel and storing said input data as said input data is received from said input channel, said input buffer means including:
means for synchronizing said incoming data to said master clock,
means for providing synchronization of an incoming frame of said input data to said master clock,
means for tracking the slot number of said incoming data, and
means for tracking the position in said slot of a bit of input data;

output buffer means for formatting said stored input data, translating between bursted and non-bursted data formats and outputting said formatted and translated data to an output channel, said output buffer means including means for translating between bursted and non-bursted data formats by reading data into a memory using the input timing characteristic thereof and reading said data out of said memory using an alternative set of timing characteristics;

said input buffer means further including means for facilitating the formation of a storage address for said output buffer means by providing slot and slot offset indicators thereto; and sequencer routing controller means for controlling the operation of said input buffer means and output buffer means wherein said router includes a plurality of non-bursted input channels and said sequencer routing controller means further includes:

routing configuration memory space for each non-bursted input channel, means for automatically selecting said routing configuration memory space for a non-bursted input channel in lieu of a bursted configuration memory when said data router is operating on a non-bursted channel, means for switching slot number and slot offset signals from said input buffer means to said output buffer means, and means for using said slot number and slot offset signals to determine storage locations.

26. A data routing method for receiving input data, having a timing characteristic, and transmitting output data that is either bursted or non-bursted, said non-bursted data comprising frames of data with each frame comprising slots of data, each slot having a position and a number, and for providing translation between bursted and non-bursted formats, including the steps of:

receiving input data from an input channel and storing said input data as said input data is received from said input channel;

formatting said stored input data, translating between bursted and non-bursted data formats and outputting said formatted and translated data to an output channel; and controlling the operation of said input buffer means and output buffer means.

* * * * *